(12) United States Patent
Jakop et al.

(10) Patent No.: US 10,722,839 B2
(45) Date of Patent: Jul. 28, 2020

(54) PARALLEL SPLIT FLOW COMBINATION GAS DRYER

(71) Applicant: Ingersoll-Rand Company, Davidson, NC (US)

(72) Inventors: Janez Jakop, Logatec (SI); Henry Y. Mark, Philadelphia, PA (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 364 days.

(21) Appl. No.: 15/881,331

(22) Filed: Jan. 26, 2018

(65) Prior Publication Data
US 2019/0232219 A1 Aug. 1, 2019

(51) Int. Cl.
| | | |
|---|---|---|
| *B01D 53/02* | (2006.01) | |
| *B01D 53/26* | (2006.01) | |
| *F24F 3/14* | (2006.01) | |
| *B01D 53/04* | (2006.01) | |
| *F24F 110/20* | (2018.01) | |

(52) U.S. Cl.
CPC ....... *B01D 53/261* (2013.01); *B01D 53/0423* (2013.01); *B01D 53/265* (2013.01); *F24F 3/1405* (2013.01); *F24F 3/1417* (2013.01); *F24F 3/1429* (2013.01); *B01D 2257/80* (2013.01); *B01D 2259/402* (2013.01); *B01D 2259/4009* (2013.01); *F24F 2003/1446* (2013.01); *F24F 2003/1458* (2013.01); *F24F 2110/20* (2018.01); *F24F 2221/00* (2013.01)

(58) Field of Classification Search
CPC ........ B01D 2257/80; B01D 2259/4009; B01D 2259/402; B01D 53/0423; B01D 53/261; B01D 53/265; F24F 2003/1446; F24F 2003/1458; F24F 2110/20; F24F 2221/00; F24F 3/1405; F24F 3/1417; F24F 3/1429
See application file for complete search history.

(56) References Cited

U.S. PATENT DOCUMENTS

| | | | | |
|---|---|---|---|---|
| 3,205,638 | A | * 9/1965 | Hagle | B01D 53/26 95/14 |
| 3,225,517 | A | * 12/1965 | Wachsmuth | B01D 53/26 95/122 |
| 4,231,768 | A | * 11/1980 | Seibert | A61L 9/00 210/DIG. 5 |

(Continued)

FOREIGN PATENT DOCUMENTS

GB 1136052 4/1966

OTHER PUBLICATIONS

Kaeser Compressors, Inc., Wayne Perry and David Phillips, Hybrid Refrigerated/Desiccant Compressed Air Dryers, 2013 World Energy Engineering Congress, also published in Kaeser Compressors, Inc. Whitepaper Jan. 2014 (8 pages).

*Primary Examiner* — Christopher P Jones
(74) *Attorney, Agent, or Firm* — Taft Stettinius & Hollister LLP

(57) ABSTRACT

A system for drying compressed gas discharged from a gas compressor is disclosed herein. The dryer system includes a desiccant drying circuit and a refrigeration drying circuit configured to transport the compressed gas in parallel through the dryer system. The desiccant drying circuit and a refrigeration drying circuit are operable for removing moisture from the compressed gas and supplying a dried gas to an end user.

20 Claims, 2 Drawing Sheets

(56) References Cited

U.S. PATENT DOCUMENTS

| | | | | |
|---|---|---|---|---|
| 4,987,748 | A * | 1/1991 | Meckler | F02G 1/043 |
| | | | | 62/176.1 |
| 5,325,676 | A * | 7/1994 | Meckler | F24F 3/06 |
| | | | | 62/93 |
| 5,816,065 | A | 10/1998 | Maeda | |
| 6,035,551 | A * | 3/2000 | Scheufler | B01D 46/00 |
| | | | | 34/475 |
| 6,203,859 | B1 * | 3/2001 | Scheufler | B01D 46/12 |
| | | | | 427/475 |
| 6,221,130 | B1 | 4/2001 | Kolodziej et al. | |
| 6,742,284 | B2 * | 6/2004 | Dinh | A24B 1/02 |
| | | | | 165/909 |
| 9,671,117 | B2 | 6/2017 | Dinnage | |
| 9,844,798 | B2 * | 12/2017 | Bruischat | F26B 21/004 |
| 10,323,867 | B2 * | 6/2019 | Vandermeulen | F24F 3/1417 |
| 2003/0121271 | A1 | 6/2003 | Dinnage | |
| 2008/0000630 | A1 * | 1/2008 | Haglid | F24F 3/14 |
| | | | | 165/287 |
| 2015/0338140 | A1 * | 11/2015 | Vandernneulen | F24F 3/147 |
| | | | | 62/238.3 |
| 2018/0328602 | A1 * | 11/2018 | Vandermeulen | F25B 13/00 |
| 2019/0145640 | A1 * | 5/2019 | Vandermeulen | F24F 11/86 |
| | | | | 62/94 |
| 2019/0154281 | A1 * | 5/2019 | Rosenblum | F24F 3/1417 |
| 2019/0217246 | A1 * | 7/2019 | Bergh | B01D 53/0446 |

* cited by examiner

US 10,722,839 B2

PARALLEL SPLIT FLOW COMBINATION GAS DRYER

TECHNICAL FIELD

The present invention generally relates to a dryer for a compressed fluid such as air and more particularly, but not exclusively to a dryer with a refrigeration system and a desiccant system operating in parallel.

BACKGROUND

Gas dryers are sometimes used to remove moisture from compressed gas downstream of a compression process. Certain prior art dryers incorporate refrigerant based systems or desiccant based systems to remove moisture from compressed air. Some existing dryer systems have various shortcomings relative to certain applications. Accordingly, there remains a need for further contributions in this area of technology.

SUMMARY

One embodiment of the present disclosure includes a gas dryer with a refrigerant system and a desiccant system operating in parallel. Other embodiments include apparatuses, systems, devices, hardware, methods, and combinations for a gas dryer are disclosed herein. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
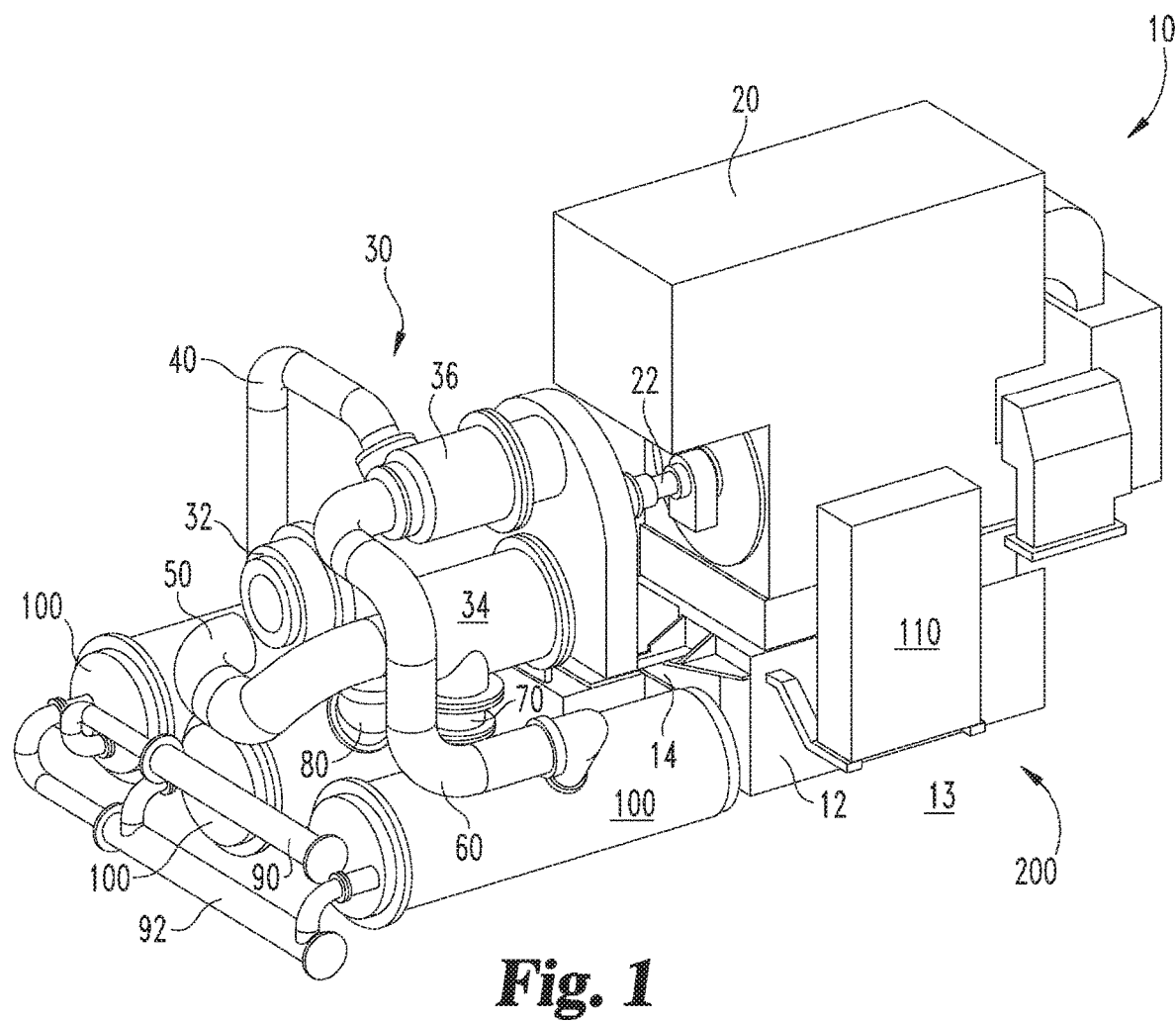
FIG. 1 is a perspective view of an exemplary compressor system that may be used in one embodiment of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The term "fluid" should be understood to include any gas or liquid medium that can be used in the compressor system as disclosed herein. It should also be understood that air is a typical working fluid, but different fluids or mixtures of fluid constituents can be used and remain within the teachings of the present disclosure. Therefore, terms such as fluid, air, gas, etc., can be used interchangeably in the present patent application. For example, in some embodiments it is contemplated that a hydrocarbon gaseous fuel including natural gas and propane, or inert gasses including nitrogen and argon may be used as a primary compressible working fluid.

Referring now to FIG. 1, an exemplary compressor system 10 can be used to compress a working fluid such as ambient air according to one embodiment of the present application. The compressor system 10 includes a primary motive source 20 such as an electric motor, an internal combustion engine or a fluid-driven turbine and the like. The compressor system 10 can include a compressor 30 with multi-stage compression and in the exemplary embodiment includes a first stage compressor 32, a second stage compressor 34, and a third stage compressor 36. In other embodiments a different number of compressor stages may be employed with the compressor 30. The compressor 30 can include centrifugal, axial and/or positive displacement compression means. The primary motive source 20 is operable for driving the compressor 30 via a drive shaft 22 to compress fluids such as air or the like.

A structural base 12 can be configured to support at least portions of the compressor system 10 on a support surface 13 such as a floor or ground and the like. One or more extensions or arms 14 can extend from the base 12 and is configured to hold portions of the compressor system 10. Portions of the compressed air discharged from the compressor 30 can be transported through more one or more conduits 40, 50, 60, 70 and 80 to one or more intercoolers 100 and/or to another compressor stage. An inlet fluid manifold 90 and an outlet fluid manifold 92 can be fluidly connected to the intercoolers 100 to provide cooling fluid such as water or other liquid coolant to cool the compressed air after discharge from one or more of the compressor stages of the compressor 30. The compressor system 10 can also include a controller 110 operable for controlling the primary motive power source and various valving and fluid control mechanisms (not shown) between the compressor 30 and intercoolers 100. The compressor system of FIG. 1 is only one exemplary form of a compressor system that can be used with the teachings of the present disclosure. Other forms and configurations are also contemplated herein. In non-limiting examples, portable compressor systems or compressor systems that are mounted onto engines for industrial operation, land vehicle operation, or water vessel operation as well as screw type, piston type can be used with the teachings of the present disclosure.

Figure 2:
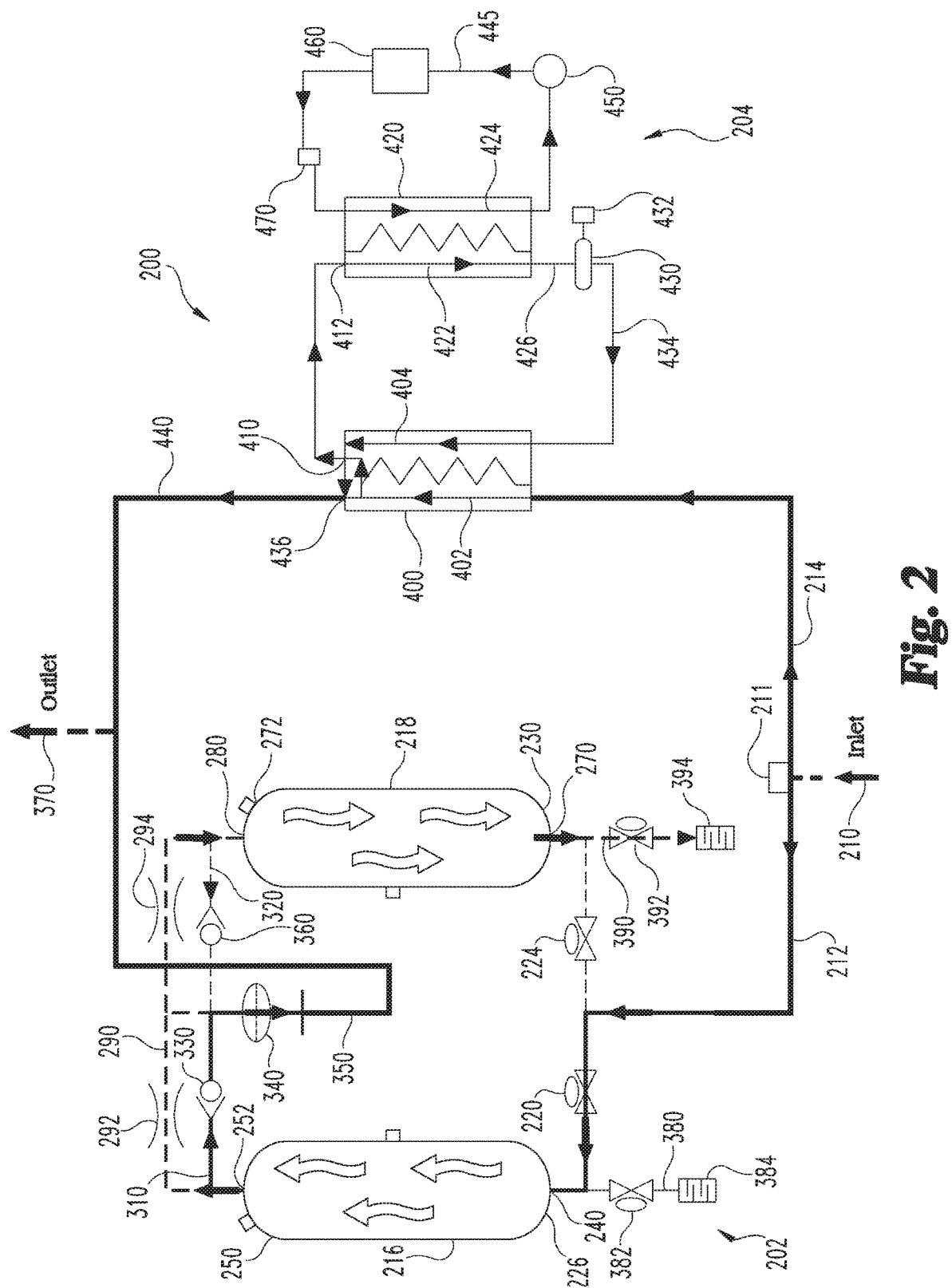
FIG. 2 is a schematic view of a dryer system according to one exemplary embodiment of the present disclosure.

Referring now to FIG. 2, a dryer system 200 is disclosed in a schematic form. The dryer system 200 can be used with the compressor described in FIG. 1 or any other type of fluid compressor as one skilled in the art would readily understand. The dryer system 200 includes a desiccant dryer system 202 and a refrigerant dryer system 204, each operating in parallel to dry a compressed working fluid discharged from a fluid compressor. The dryer system 200 removes at least a portion of the moisture entrained in the gas so that an end user receives compressed gas with a moisture content below a desired threshold. In one form, the dryer system 200 can produce a lower pressure dew point compressed working fluid than a refrigerated dryer alone while using less energy than a desiccant dryer. The desiccant dryer system 200 can include, but is not limited to a pressure swing desiccant dryer, a heated purge desiccant dryer or a blower purge desiccant dryer.

The dryer system 200 includes a dryer inlet 210 which is then split off to an inlet 212 to the desiccant dryer system and to an inlet 214 to the refrigerant dryer system 204. The desiccant inlet 212 transfers moist compressed flow from the compressor 30 to the desiccant dryer system 202 to produce dry air defined by a desired relative humility or pressure dew point temperature. The refrigerant inlet 214 transfers a portion of the compressed fluid discharged from the compressor 30 to the refrigerant system 204 to produce a dry gas defined by a desired moisture content. In some forms the flow split between the desiccant dryer system 202 and the refrigerant dryer system 204 can be a 50-50 split and in other forms the split can be varied based upon the requirements of the end user. An optional control valve 211 can be configured to control a flow split through each of the inlets 212, 214. The control system can monitor the pressure drop across each of the dryer systems 202, 204 or through a flow monitoring device fluidly coupled to each of the dryer systems 202, 204.

The desiccant inlet 212 transfers a flow of compressed fluid to one of either a first desiccant tank 216 or a second desiccant tank 218. Each of the first and second desiccant tanks 216, 218 is configured to dry or regenerate depending on a controlled flow configuration. In the disclosed embodiment, the first desiccant tank 216 is the drying tank and the second tank 218 is the regenerating tank. The flow configuration can be reversed after the desiccant in the drying tank reaches a threshold moisture saturation level. Regeneration is required when the desiccant becomes saturated to an extent that the tank falls below a threshold capability to remove minimum quantity of moisture from the flow of compressed gas.

A first inlet control valve 220 is positioned in fluid communication with the desiccant inlet 212 upstream of the first desiccant tank 216. A second inlet control valve 224 is positioned in fluid communication with the desiccant inlet 214 upstream of the second desiccant tank 218. When the first desiccant tank 216 is operating as a fluid drying tank, the first inlet control valve 220 is opened and the second inlet control valve 224 is closed to direct a flow of moist compressed fluid to enter into a first end 226 of the first desiccant tank 216. Likewise, when the second desiccant tank 218 is operating in a drying mode the second inlet control valve 224 is opened and the first flow control valve 220 is closed to direct the moist compressed fluid to enter onto the first end 230 of the second desiccant tank 218.

The first desiccant tank 216 includes a first port 240 proximate the first end 226 to permit a flow of gas to either ingress or egress to/from the first desiccant tank 216 therethrough. When the first desiccant tank 216 operating as at drying tank, the first port 240 operates as an inlet port to permit the compressed humid air to enter into the first desiccant tank 216. When the first desiccant tank 216 is operating as a regeneration tank, the first inlet port 240 will operate as an egress port to permit regenerated compressed fluid to exit therefrom. The first desiccant tank 216 includes a second port 252 proximate a second end 250 thereof. The second port 252 also operates as either an ingress port or egress port depending on whether the desiccant tank 216 is operating in a drying mode or a regeneration mode. During the regeneration mode, a portion of the dried air exiting a dryer tower used for the drying process can be depressurized.

Similarly to the first tank 216, the second desiccant tank 218 includes a third port 270 coupled proximate a first end 230 of the second desiccant tank 218 and a fourth port 280 coupled proximate a second end 272 of the second desiccant tank 218. The third and fourth ports 270, 280, respectively of the second desiccant tank 218 can operate to either permit flow to ingress or egress there through depending on whether the second desiccant tank 218 is in a drying mode or a regeneration mode.

A regeneration transfer conduit 290 extends between the first desiccant tank 216 and the second desiccant tank 218 proximate the second ends 250, 272, respectively. The regeneration transfer conduit 290 permits a portion of the flow from the tank operating in a drying mode to be transferred to the other tank so that a portion of the dry air egressed through the regeneration transfer conduit 290 may be used to regenerate the desiccant in the other tank. The regeneration transfer conduit 290 can include first and second control orifices 292, 294 to control the flow rate of dry air transferred between the first desiccant tank 216 and the second desiccant tank 218, respectively. The second port 250 of the first desiccant tank 216 and the fourth port 280 of the second desiccant tank 218 are in fluid communication with the regeneration transfer conduit 290.

A first dryer outlet conduit 310 is also in fluid communication with the second port 252 of the first desiccant tank 216 and a second dryer outlet conduit 320 is also in fluid communication with the fourth port 280 of the second desiccant tank 218. The first dryer outlet conduit 310 can include a first check valve 330 positioned between the second port 252 and a desiccant outlet port 340. Similarly, the second dryer outlet conduit 320 includes a second check valve 360 positioned between the fourth port 280 and the desiccant outlet port 340. The one way check valves 330, 360 operates to ensure that dry air can be discharged from either the first desiccant tank 216 or second desiccant tank 218 while preventing back flow, depending on the mode of operation of the first and second desiccant tanks 216, 218. An outlet conduit 350 is configured to transport dry air from the desiccant outlet port 340 to a dryer system outlet 370 where the flow from the desiccant system 202 is combined with the dryer outlet from the refrigerant dryer system 204 which will be described in detail below.

When operating in a regeneration mode, the first port 240 of the first desiccant tank 216 is in fluid communication with a first discharge conduit 380. The first discharge conduit 380 is configured to receive regeneration flow when regeneration flow is discharged through the first part 240. A first discharge valve 382 is connected to the discharge conduit to control a regeneration discharge flow. The first discharge valve 382 permits flow of a regeneration discharge fluid to a first regeneration discharge element 382 when the first desiccant tank 216 is operating in a regeneration mode. In similar fashion, a second discharge conduit 390 is in fluid communication with the third port of the second desiccant tank 218 to permit a flow of regenerating fluid to exit from the tank 218 when a discharge valve 392 is opened. The discharge valve 394 is operable to control a discharge flow from the tank 218 to a second discharge element 394. When either of the desiccant tanks 216, 218 are operating in a regeneration mode the corresponding first or second inlet control valves (220 or 224) will be closed to restrict compressed gas from entering into a respective regenerating desiccant tank 216 or 218.

Referring now to the refrigerant drying system 204, the dryer inlet 210 transfers a portion of the fluid flow through the refrigerant system inlet 214 and to a first heat exchanger 400. The first heat exchanger 400 operates as a pre-cooler for the relatively hot compressed working fluid entering into the refrigerant dryer system 204 and as a pre-heater 404 for the compressed fluid just prior to exiting from the refrigerant dryer system 204. After being cooled in the pre-cooler 402, the working fluid exits the first heat exchanger 400 through a first heat exchanger outlet conduit 410. The first heat exchanger outlet conduit 410 will transfer the compressed working fluid to a second heat exchanger 420. The second heat exchanger 420 includes a compressed fluid chiller portion 422 and an evaporator portion 424. The chiller 422 is operable to cool the working fluid to a temperature that causes condensation of water particles within the gas flow stream.

A moisture separator 430 is positioned downstream of the air chiller 422. The moisture separator 430 can include internal elements such as deflection baffles or the like to promote separation of liquid condensate from gas constituents. A drain valve 432 in fluid communication with the moisture separator 430 may be operated to open after a pre-determined amount of time or in response to a signal from a level sensor as one skilled in the art would understand. After the working fluid flows through the second heat exchanger 420 and liquid condensate is removed in the moisture separator 430, the dry compressed working fluid is directed through a pre-heater inlet conduit 434 back to the first heat exchanger 400. The working fluid is heated to a desired temperature through the pre-heater 404 prior to exiting through a refrigerant system outlet conduit 440. The refrigerant system outlet conduit 440 directs the dry working fluid to the dryer system outlet 370 where the flow merges with the dry air discharged from the desiccant dryer system 202.

The refrigerant drying system includes a refrigerant circuit 445 that flows in continuous circulation through a compressor 450, a condenser 460, an expansion valve 470 in order to cool the compressed refrigerant prior to entering the evaporator 424 in the second heat exchanger 420. The refrigerant receives heat from the compressed working fluid thereby evaporating the refrigerant into a gas. The refrigerant exits the evaporator portion 424 of the second heat exchanger 420 and enters into the compressor 450 to complete the cycle as is known by one skilled in the art.

In another embodiment, the heat generated by the refrigeration process can be used to preheat the purge air used for the regeneration cycle of the desiccant dryer to improve the drying performance of the desiccant dryer. This will simultaneously increase operating efficiency of the refrigeration by helping to reduce the condensing temperature.

It should be noted that the various fluid flow paths shown in FIG. 2 are for schematic illustration purposes only and do not necessarily imply that the flow direction is always in the direction to those illustrated by the arrow heads. In some forms the direction flow can be in the direction indicated in the schematic while in other forms the direction of flow can be in the opposite direction to that indicated by the arrow heads. Further it should also be understood that while a "single flow path" line is depicted throughout the system, that each flow path line can include a plurality of discrete conduits to define the actual flow path.

In one aspect, the present disclosure includes a system comprising a fluid compressor operable to compress a working fluid; a dryer system in fluid communication with the compressor, the dryer system comprising: a desiccant drying system having a first flow circuit operable for removing moisture from the working fluid; a refrigeration drying system having a second flow circuit operable for removing moisture from the working fluid; and wherein the first and second flow circuits are configured to transport the working fluid in parallel through the dryer system.

In refining aspects, the system further comprises a dryer inlet conduit fluidly coupled to a compressor discharge flow of compressed working fluid; a desiccant system inlet conduit fluidly coupled to the dryer inlet conduit; and a refrigerant system inlet conduit fluidly coupled to the dryer inlet conduit; wherein the desiccant system inlet conduit and the refrigerant system inlet conduit each receive fifty percent of a total flow of working fluid discharged by the compressor; the system further comprises at least one split flow control valve in fluid communication with the desiccant system inlet conduit and the refrigerant system inlet conduit, the split flow control valve operable to control a flow split of working fluid between the desiccant and refrigerant drying systems; the system further comprises a dryer outlet conduit in fluid communication with a refrigeration dryer system outlet conduit and a desiccant dryer system outlet conduit; wherein the desiccant drying system includes first and second desiccant tanks; the system further comprises a regeneration transfer conduit connected between the first and second desiccant tanks; the system further comprises first and second dry working fluid outlet conduits fluidly coupled to the first and second desiccant tanks, respectively and selectively to a desiccant dryer system outlet conduit; the system further comprises first and second check valves fluidly coupled to the first and second dry working fluid outlet conduits, respectively; wherein the first and second desiccant tanks alternate between a drying mode and a regenerating mode and wherein a heat exchanger is in fluid communication with the first and second desiccant tanks to preheat a regeneration flow of working fluid entering either of the first or second desiccant tanks with heat generated by the refrigeration system; the system further comprises a first heat exchanger and a second heat exchanger fluidly coupled between the refrigerant system inlet conduit and a refrigerant system outlet conduit; the system wherein the first heat exchanger is operable for exchanging heat between relatively warmer working fluid and relatively cooler working fluid; the system wherein the second heat exchanger is operable for exchanging heat between relatively warmer working fluid and relatively cooler refrigerant.

In another aspect, the present disclosure includes a gas dryer comprising, a first gas flow path extending through a desiccant dryer circuit; a second gas flow path extending through a refrigerant dryer circuit; a gas dryer system inlet fluidly coupled to each of the first and second gas flow paths; a gas dryer system outlet fluidly coupled to each of the first and second gas flow paths; and wherein the first and second gas flow paths transport a compressed gas through the desiccant dryer circuit and the refrigerant dryer circuit in parallel.

In refining aspects, the present disclosure further comprises a gas compressor operable to discharge the compressed gas; in refining aspects, wherein a dew point pressure temperature of the compressed gas is lower at the gas dryer system outlet than at the gas dryer system inlet; wherein a flow of compressed gas is evenly split between the first and second gas flow paths.

In another aspect, the present disclosure includes a method comprising, transporting a flow stream of pressurized working fluid discharged from a compression device to a dryer system inlet conduit; splitting the flow stream between a desiccant dryer system and a refrigerant dryer system; and flowing the pressurized working fluid through the desiccant dryer system the refrigerant dryer system in parallel from the dryer system inlet to a dryer system outlet.

In refining aspects, the method further comprises drying the pressurized working fluid in a first desiccant tank and regenerating desiccant in a second desiccant tank with a portion of dried working fluid discharged from the first desiccant tank and wherein the portion of dried working fluid is preheated with heat generated from the refrigerant dryer system prior to entering the second tank; cooling the pressurized fluid in a precooler of a first heat exchanger in the refrigerant dryer system; cooling the pressurized fluid in a chiller of a second heat exchanger downstream of the first heat exchanger; and removing moisture from the pressurized fluid in a moisture separator downstream of the second heat exchanger.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A system comprising:
   a fluid compressor operable to compress a working fluid;
   a dryer system in fluid communication with the compressor, the dryer system comprising:
      a desiccant drying system having a first flow circuit operable for removing moisture from the working fluid;
      a refrigeration drying system having a second flow circuit operable for removing moisture from the working fluid; and
      wherein the first and second flow circuits are configured to transport the working fluid in parallel through the dryer system.

2. The system of claim 1, further comprising:
   a dryer inlet conduit fluidly coupled to a compressor discharge flow of compressed working fluid;
   a desiccant system inlet conduit fluidly coupled to the dryer inlet conduit; and
   a refrigerant system inlet conduit fluidly coupled to the dryer inlet conduit.

3. The system of claim 2, wherein the desiccant system inlet conduit and the refrigerant system inlet conduit each receive fifty percent of a total flow of working fluid discharged by the compressor.

4. The system of claim 2 further comprising at least one split flow control valve in fluid communication with the desiccant system inlet conduit and the refrigerant system inlet conduit, the split flow control valve operable to control a flow split of working fluid between the desiccant and refrigerant drying systems.

5. The system of claim 1, further comprising a dryer outlet conduit in fluid communication with a refrigeration dryer system outlet conduit and a desiccant dryer system outlet conduit.

6. The system of claim 1, wherein the desiccant drying system includes first and second desiccant tanks.

7. The system of claim 6 further comprising a regeneration transfer conduit connected between the first and second desiccant tanks.

8. The system of claim 6 further comprising first and second dry working fluid outlet conduits fluidly coupled to the first and second desiccant tanks, respectively and selectively to a desiccant dryer system outlet conduit.

9. The system of claim 8 further comprising first and second check valves fluidly coupled to the first and second dry working fluid outlet conduits, respectively.

10. The system of claim 6, wherein the first and second desiccant tanks alternate between a drying mode and a regenerating mode and wherein a heat exchanger is in fluid communication with the first and second desiccant tanks to preheat a regeneration flow of working fluid entering either of the first or second desiccant tanks with heat generated by the refrigeration system.

11. The system of claim 2, further comprising a first heat exchanger and a second heat exchanger fluidly coupled between the refrigerant system inlet conduit and a refrigerant system outlet conduit.

12. The system of claim 11, wherein the first heat exchanger is operable for exchanging heat between relatively warmer working fluid and relatively cooler working fluid.

13. The system of claim 11, wherein the second heat exchanger is operable for exchanging heat between relatively warmer working fluid and relatively cooler refrigerant.

14. A gas dryer comprising:
   a first gas flow path extending through a desiccant dryer circuit;
   a second gas flow path extending through a refrigerant dryer circuit;
   a gas dryer system inlet fluidly coupled to each of the first and second gas flow paths;
   a gas dryer system outlet fluidly coupled to each of the first and second gas flow paths; and
   wherein the first and second gas flow paths transport a compressed gas through the desiccant dryer circuit and the refrigerant dryer circuit in parallel.

15. The gas dryer of claim 14, further comprising a gas compressor operable to discharge the compressed gas.

16. The gas dryer of claim 15, wherein a dew point pressure temperature of the compressed gas is lower at the gas dryer system outlet than at the gas dryer system inlet.

17. The gas dryer of claim 14, wherein a flow of compressed gas is evenly split between the first and second gas flow paths.

18. A method comprising:
   transporting a flow stream of pressurized working fluid discharged from a compression device to a dryer system inlet conduit;
   splitting the flow stream between a desiccant dryer system and a refrigerant dryer system; and
   flowing the pressurized working fluid through the desiccant dryer system the refrigerant dryer system in parallel from the dryer system inlet to a dryer system outlet.

19. The method of claim 18 further comprising drying the pressurized working fluid in a first desiccant tank and regenerating desiccant in a second desiccant tank with a portion of dried working fluid discharged from the first desiccant tank and wherein the portion of dried working fluid is preheated with heat generated from the refrigerant dryer system prior to entering the second tank.

20. The method of claim 19, further comprising:
   cooling the pressurized fluid in a precooler of a first heat exchanger in the refrigerant dryer system;

cooling the pressurized fluid in a chiller of a second heat exchanger downstream of the first heat exchanger; and
removing moisture from the pressurized fluid in a moisture separator downstream of the second heat exchanger.

\* \* \* \* \*